INVENTORS
HARRY R. SMITH
JOHN RUSTON
BY Darby & Darby
ATTORNEYS

INVENTORS
HARRY R. SMITH
JOHN RUSTON
BY
Darby & Darby
ATTORNEYS

Patented Apr. 14, 1953

2,635,183

UNITED STATES PATENT OFFICE 2,635,183

TRANSMITTER TESTING INSTRUMENT

Harry R. Smith, Glen Ridge, and John Ruston, Fairlawn, N. J., assignors to Allen B. Du Mont Laboratories, Inc., Clifton, N. J., a corporation of Delaware Application September 16, 1950, Serial No. 185,264

4 Claims. (Cl. 250—17)

This invention relates to electrical testing instruments and particularly to instruments for measuring the frequency response of television transmitters.

In apparatus of the type disclosed in copending application, Serial No. 185,248, entitled "Television Test System" filed September 16, 1950, by Francis C. Grace and Robert G. Artman and assigned to the same assignee, it is proposed to use an intermediate frequency above the highest modulating frequency in order to avoid spurious responses due to the lower, vestigial sideband. Use of an intermediate frequency of several megacycles entails the use of a tuned, narrow-band intermediate frequency amplifier.

This invention represents an improvement in that a very low intermediate frequency is used eliminating the critical, tuned stages in the I. F. amplifier without impairing the accuracy of measurement attained in the abovementioned instrument. Moreover, use of a very low intermediate frequency leads to other important benefits in that the second detector may also be eliminated which enables the instrument to operate with an alternating current-amplifier in place of the special direct current deflection amplifier which was disclosed in the above-mentioned application. Another advantage is that certain switching circuits operate at low frequency instead of at the high transmitter frequency.

It is one object of this invention to provide an improved electrical testing instrument.

Other objects are to provide a simplified circuit for measuring the frequency response of transmitters and particularly of vestigial sideband transmitters such as are used in television systems; and to provide in such testing instruments a heterodyne receiver without an I. F. amplifier, a second detector, or a D. C. amplifier.

Still further objects will be apparent after reading the following specification together with the drawings in which.

Figure 1:
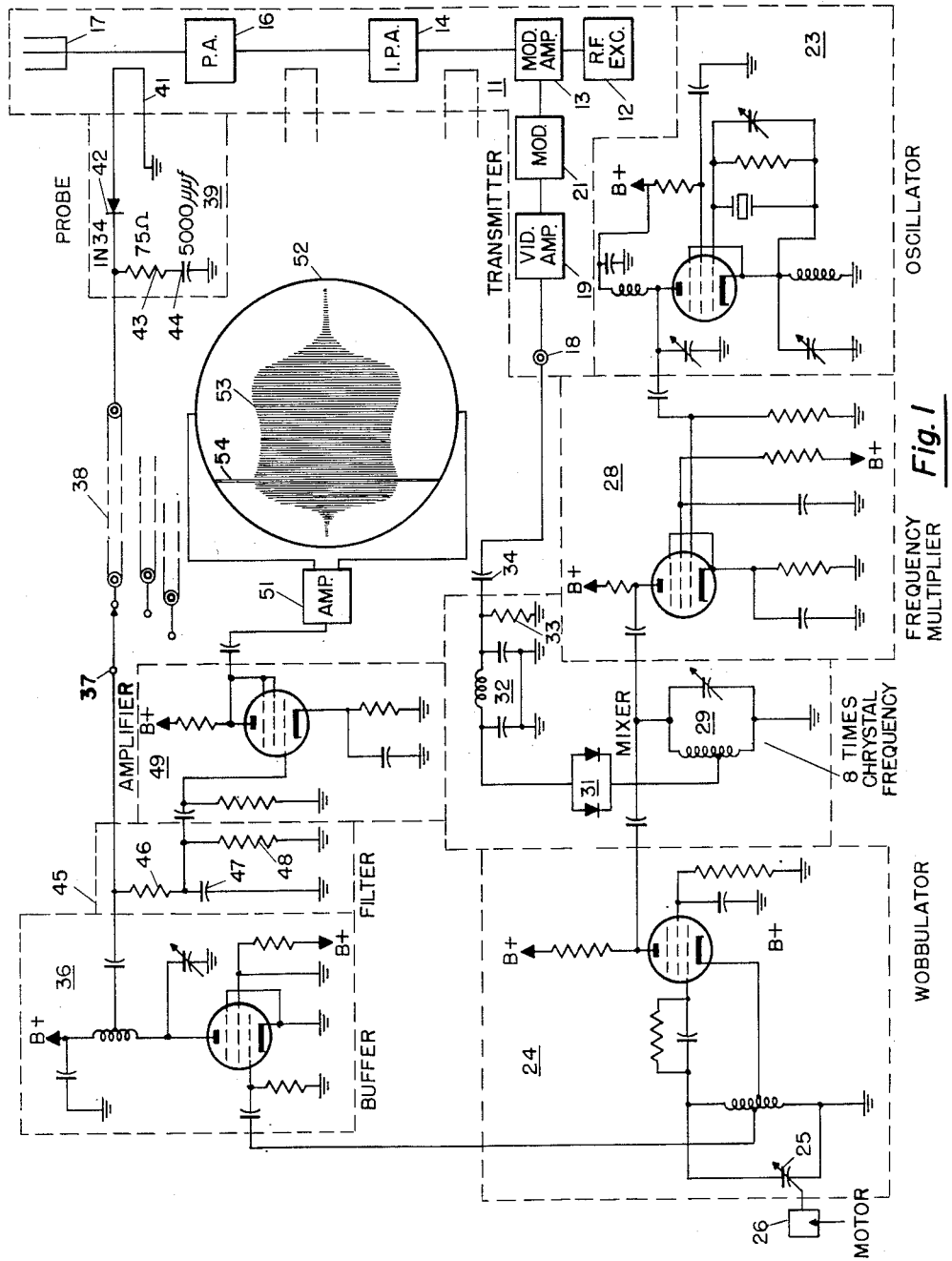
Fig. 1 is a diagram, partly schematic and partly in block form, of a transmitter and a testing instrument forming one embodiment of the invention.

The television transmitter, as shown within the dotted outline 11 in Fig. 1, comprises a carrier frequency signal generating radio frequency, or R. F., exciter 12, a modulated amplifier 13, an intermediate power amplifier 14, the power amplifier 16, and the antenna 17. The video frequencies are applied to the transmitter at the input terminal 18 of the video amplifier 19 from which they pass to the modulator 21 and to the modulated amplifier 13.

The signal generating portion of the measuring instrument comprises a fixed frequency, harmonic oscillator 23 in addition to a variable frequency oscillator 24 in which the condenser 25, rotated by the motor 26, forms the frequency varying element. The oscillator 23 is connected through a frequency multiplier 28 to a tuned circuit 29 to which the oscillator 24 is also connected. A nonlinear element 31 preferably a pair of crystal diodes in parallel connects the tuned circuit 29 to a low pass filter 32 terminated by a load resistor 33, which is connected to the input terminal 18 of the transmitter 11 by the condenser 34.

The oscillator 24 is also connected through a buffer stage 36 and a switch 37 to one of a plurality of coaxial lines. A typical coaxial line 38 leads from the switch 37 to an electrical signal mixer 39 comprising a pick-up device 41, which must be located adjacent the point to be measured, in this case the antenna transmission line, in order to pick up energy from that point and that point alone, a crystal mixer diode 42 together with its load resistor 43, and a condenser 44 effectively grounding one end of the load resistor for all alternating currents. The remainder of the coaxial lines from the switch 37 lead to additional similar probes.

A low pass filter 45 comprising, in this case, a series resistor 46, a shunt condenser 47, and a terminating resistor 48 connects the switch 37 to an audio amplifier 49 which feeds a vertical deflection amplifier 51 for a cathode-ray tube 52.

Figure 2:
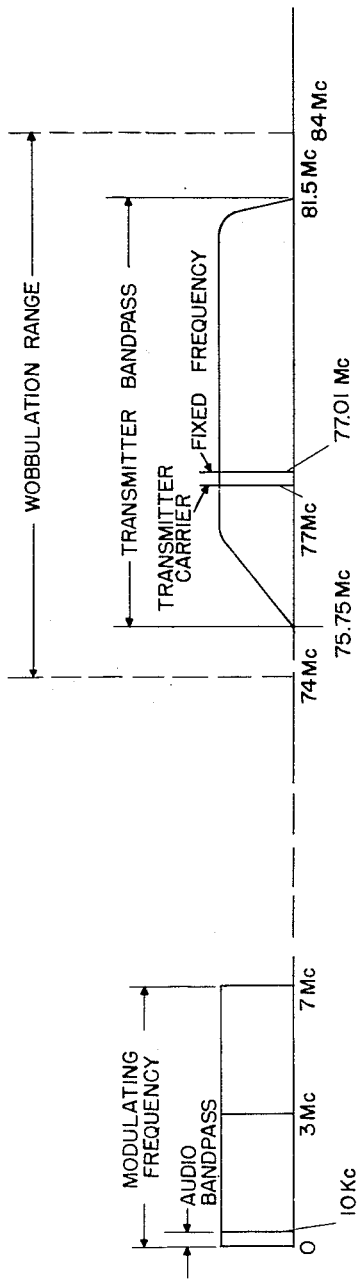
Fig. 2 illustrates the frequency relations of the various parts of the circuit in Fig. 1.

In measuring the frequency response it is desirable to examine a band wider than the transmitter's assigned, 6 megacycle channel in order to determine whether some misadjustment may have extended the bandwidth. For the channel having a carrier at 77 megacycles as illustrated in Fig. 2 the tuning condenser 25 is adjusted (or chosen) to tune the oscillator 24, or wobbulator, as it is called, over a band of frequencies extending from 74 megacycles to 84 megacycles, although this band may be shifted in order to examine any part of the spectrum adjacent the assigned channel.

It should be noted that the band of frequencies over which the oscillator 24 varies is essentially the same as the band of frequencies to be examined, in contradistinction to the apparatus disclosed by the above Grace and Artman application Serial No. 185,248 wherein the band of frequencies covered by the wobbulator oscillator differed by 15 megacycles, the intermediate frequency, from the band under observation.

In order to provide the video frequency modulating signal for the transmitter, the output signal of oscillator 24 is mixed with a fixed frequency signal in the tuned circuit 29. A stable, crystal oscillator 23 generates a comparatively low frequency signal which is multiplied by a factor of four in the plate circuit thereof and again by two in the amplifier 28 to produce the desired fixed frequency. A crystal oscillator is used in view of the fact that since the final frequency must differ from the carrier frequency of the transmitter by at least one thousand cycles in order to produce a readable pattern on the face of the cathode-ray tube but preferably by less than fifty thousand cycles, the frequency of the fixed oscillator must not drift by more than .065%. The largest allowable frequency difference of fifty thousand cycles is approximately .1% of the lowest frequency in the lowest, presently operating television channel. Actually, the preferred frequency difference between the carrier and the signal from the oscillator 23 is around ten thousand cycles, or 10 kc.

The upper limit of this difference frequency is fixed by present standards which fix the amplitude of the sidebands 100 kc. from the carrier as the reference amplitude for all of the sidebands. Consequently, the difference frequency must be sufficiently below 100 kc. to insure an accurate measurement at the reference sideband.

The upper limit of the difference frequency is further restricted by the desired resolution or ability of the system to examine only a narrow portion of the band at a time. Since no narrow-band filters or I. F. stages are used, the resolution is dependent on the untuned, audio amplifier, which must have an upper frequency limit that includes the difference frequency. The term "audio," as used here, contemplates that frequently used by those who customarily deal with much higher frequencies, to indicate an amplifier having a comparatively low upper frequency limit, even though this limit may be as much as 30 or 40 kc.—far above the audible range. The greater the desired resolution, the lower the upper frequency limit of the audio amplifier must be.

The mixture of signals in the tuned circuit 29 contains a low-frequency component which, depending on the exact band of frequencies over which the oscillator 24 tunes, is in the order of zero to seven megacycles. When utilizing the frequencies shown in Fig. 2, i. e. 74 to 84 mc. for oscillator 24, and 77.01 mc. for the multiplied frequency of the fixed oscillator 23, the low frequency component will vary in order from 3 mc. to zero to 7 mc. as the oscillator 24 tunes from 74 to 84 mc. The production of the low frequency component in the mixture of the two oscillator signals takes place by virtue of the well known mixing action of the non-linear element 31, and it is filtered by the low pass filter 32 before being passed on through the condenser 34 to the video input terminal 18 of the transmitter.

The buffer amplifier 36 transmits the wobbulated signal from the oscillator 24 to the switch 37, and from there through one of the transmission lines, for instance line 38, to the corresponding probe, as probe 39, where these oscillations mix with energy picked up by the loop 41. The amplitude of the oscillations coming from the amplifier 36 is selected to exceed considerably the amplitude of the signals picked up by the loop 41 so that the amplitude of the mixed oscillations in the probe 39 will be determined by the amplitude of the picked up signal, in the well known heterodyne manner. The mixed oscillations then pass along the same coaxial line and the low frequency component thereof passes through filter 45. None of the signal components can pass through the buffer amplifier 36 to affect the operation of the oscillator 24. The one-way action of the buffer stage 36 is enhanced by tapping the output coil to provide a low impedance output circuit in the forward direction but a high impedance circuit in the reverse direction.

The only two frequency components of importance of the signals passing through the switch 37 are the signals from the oscillator 24 and the low frequency component of the mixed oscillations. As explained previously, the amplitude of the first of these two signals is not critical provided only that it is high compared to any of the others. Therefore there is no appreciable effect on the amplitude of this signal by the stray impedances associated with the switch. On the other hand, the amplitude of the low frequency component is all-important, since it is the end result of the entire apparatus, but because it is at such a low frequency, the stray impedances will have a negligible effect.

The filtered low frequency component is amplified in the audio amplifier 49 and passed on to the vertical deflection amplifier 51 from which it passes to the vertical deflection plates of the cathode-ray tube 52. A signal corresponding to the rate at which the oscillator 24 is swept through its band is applied by any well known means to the horizontal deflection plates of tube 52. The resultant pattern 53 on the face of tube 52 is a 10 kc. (the chosen low frequency) wave amplitude modulated in accordance with the signal picked up by loop 41 and is, therefore, the frequency response of the transmitter between the input terminal 18 and the pick-up device 41. By successive measurements at each of the stages in the transmitter, the individual response of each stage may be determined.

It should be noted that there is no rectification of the amplitude modulated 10 kc. wave, and hence, a signal of zero amplitude picked up at the loop 41 results in no vertical deflection of the cathode-ray spot, thus automatically setting the zero reference level. Prior calibration of the screen, as by the well-known, transparent scales, may be used to set the 100 kc. reference level and other levels may be determined from these two.

The sharp increase in amplitude, represented at 54, occurring at the carrier frequency, results from the fact that, within the bandpass of the audio amplifier, both sidebands contribute energy. For modulating frequencies above the bandpass of the audio amplifier, only the sideband which, beating with the signal from amplifier 36, produces a 10 kc. beat will pass through the audio part of the system and appear on the face of the cathode-ray tube. It is important to note that no harmonic of the modulating frequency, such as might be produced by distortion in the mixer 31, can produce any serious results for the reason that it will be at least as far removed from the part of the spectrum undergoing examination as the carrier, and if the resolution of the system is sufficient to prevent the pattern 53 from being affected by the carrier, it will likewise be unaffected by the harmonic.

Although this invention has been described in terms of a specific embodiment, modifications may be made within the scope of the following claims.

What is claimed is:

1. An electrical testing circuit for a transmitter having a source of oscillations at a carrier frequency, said circuit comprising a second source of oscillations tunable continuously through a band of frequencies containing the pass band of the transmitter; a third source of oscillations tuned to a frequency differing from said carrier frequency by less than .2%; a first mixer connected to said second source and said third source to mix the outputs therefrom, the output of said mixer being connected to said transmitter to modulate said carrier; an electrical signal pickup device to pick up a portion of said modulated carrier, a second mixer connected to said pick-up device and to said second source to mix the output thereof with said modulated carrier; and an indicating device connected to said second mixer.

2. An electrical testing circuit for a transmitter having a source of oscillations at a carrier frequency, said circuit comprising a second source of oscillations tunable continuously through a band of frequencies containing the pass band of the transmitter; a third source of oscillations tuned to a frequency differing from said carrier frequency by an audio frequency; a first mixer connected to said second source and said third source to mix the outputs therefrom, the output of said mixer being connected to said transmitter to modulate said carrier; an electrical signal pick-up device to pick up a portion of said modulated carrier, a second mixer connected to said pick-up device and to said second source to mix the output thereof with said modulated carrier; an audio amplifier connected to said second mixer to amplify the output thereof; and a cathode-ray tube having a pair of deflection plates connected to said audio amplifier.

3. An electrical testing circuit for a transmitter having a source of oscillations at a carrier frequency, said circuit comprising a second source of oscillations tunable continuously through a band of frequencies containing the pass band of the transmitter; a third source of oscillations tuned to a frequency differing from said carrier frequency by an audio frequency; a first mixer connected to said second source and said third source to mix the outputs therefrom, the output of said mixer being connected to said transmitter to modulate said carrier; an electrical signal pick-up device to pick up a portion of said modulated carrier, a second mixer connected to said pick-up device and to said second source to mix the output thereof with said modulated carrier and to produce a signal voltage having an audio frequency component; a low pass filter connected to said second mixer to pass only said audio frequency component; an audio amplifier connected to said filter; and a cathode-ray tube having a pair of deflection plates connected to said audio amplifier.

4. In an electrical testing circuit for a transmitter which has a source of oscillations at a carrier frequency, a circuit comprising a second source of oscillations tunable continuously through a band of frequencies containing the pass band of the transmitter; a first low-pass filter; means connecting said first filter to an output terminal of said second source; a third source of oscillations tuned to a frequency differing from said carrier frequency by less than .2%; a first mixer connected to an output terminal of said second source and said third source to mix the output oscillations therefrom; a second filter connected to said mixer to pass only the low frequency components of the mixed oscillations; a connection between the output terminals of said filter and the modulation input terminals of said transmitter whereby said low frequency components are connected to said transmitter to modulate said carrier; an electrical signal pick-up device to pick up, at selected points in said transmitter, signal voltages representing said modulated carrier; a second mixer connected to said pick-up device, said second mixer being adjacent said pick-up device; means connecting input terminals of said second mixer and output terminals of said second source to supply a signal from said second source to said second mixer and provide a return path to said first filter for the mixed oscillations generated in said second mixer; and an indicating device connected to output terminals of said second low pass filter.

HARRY R. SMITH.
JOHN RUSTON.

References Cited in the file of this patent

UNITED STATES PATENTS

| Number | Name | Date |
|---|---|---|
| 2,534,957 | Delvaux | Dec. 19, 1950 |

FOREIGN PATENTS

| Number | Country | Date |
|---|---|---|
| 113,637 | Australia | Aug. 21, 1941 |